(12) United States Patent
Chen (10) Patent No.: US 9,166,998 B2
(45) Date of Patent: Oct. 20, 2015

(54) METHOD AND APPARATUS FOR DETERMINING SECURITY INFORMATION OF AN UNKNOWN FILE IN A CLOUD SECURITY SYSTEM

(71) Applicant: Tencent Technology (Shenzhen) Company Limited, Shenzhen, Guangdong (CN)

(72) Inventor: Yang Chen, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/407,903

(22) PCT Filed: Jun. 13, 2013

(86) PCT No.: PCT/CN2013/077162
§ 371 (c)(1),
(2) Date: Dec. 12, 2014

(87) PCT Pub. No.: WO2013/185612
PCT Pub. Date: Dec. 19, 2013

(65) Prior Publication Data
US 2015/0188939 A1    Jul. 2, 2015

(30) Foreign Application Priority Data

Jun. 13, 2012 (CN) .......................... 2012 1 0194013

(51) Int. Cl.
*H04L 29/06* (2006.01)
*G06F 21/60* (2013.01)

(52) U.S. Cl.
CPC ............ *H04L 63/1433* (2013.01); *G06F 21/60* (2013.01); *H04L 63/00* (2013.01); *H04L 63/105* (2013.01)

(58) Field of Classification Search
CPC .......................... H04L 63/1433; H04L 63/105
See application file for complete search history.

(56) References Cited

U.S. PATENT DOCUMENTS

| 8,220,054 | B1 * | 7/2012 | Lu ..................................... 726/24 |
| 8,321,958 | B1 * | 11/2012 | Fleming et al. .................. 726/29 |
| 8,607,349 | B1 * | 12/2013 | Zaitsev ............................ 726/24 |
| 9,009,820 | B1 * | 4/2015 | McDougal et al. ............. 726/22 |
| 2009/0019546 | A1 * | 1/2009 | Park et al. ........................ 726/24 |

(Continued)

FOREIGN PATENT DOCUMENTS

| CN | 1818823 | 8/2006 |
| CN | 101924761 | 12/2010 |

(Continued)

OTHER PUBLICATIONS

International Written Opinion (English translation) from PCT International Application No. PCT/CN2013/077162, mated Sep. 19, 2013, 19 pages.

(Continued)

*Primary Examiner* — Michael Pyzocha
(74) *Attorney, Agent, or Firm* — Blakely Sokoloff Taylor & Zafman LLP (57) ABSTRACT

A method for determining security information of an unknown file in a cloud security system is provided. The method includes: a cloud security serving end receives file security querying information reported by a cloud client end when a preconfigured monitoring point is triggered, wherein the file security querying information comprises identifier information and behavior information of a file; creates a behavior sequence of the file within a lifecycle according to the file security querying information of the file, analyzes the behavior sequence of the file within the lifecycle, and determines file security information of the file according to an analyzed result.

14 Claims, 4 Drawing Sheets

(56) References Cited

U.S. PATENT DOCUMENTS

| | | |
|---|---|---|
| 2010/0011432 A1 | 1/2010 | Edery et al. |
| 2010/0100963 A1* | 4/2010 | Mahaffey ................ 726/25 |
| 2010/0257605 A1 | 10/2010 | McLaughlin et al. |
| 2012/0151211 A1* | 6/2012 | Kreiner et al. ............ 713/168 |
| 2012/0240183 A1* | 9/2012 | Sinha ....................... 726/1 |
| 2013/0174257 A1 | 7/2013 | Zhou et al. |
| 2013/0185797 A1 | 7/2013 | ZHOU et al. |
| 2014/0259167 A1* | 9/2014 | Babu et al. ................ 726/23 |

FOREIGN PATENT DOCUMENTS

| | | |
|---|---|---|
| CN | 101924762 | 12/2010 |
| CN | 102281540 | 12/2011 |
| CN | 102413142 | 4/2012 |
| CN | 102752290 | 10/2012 |

OTHER PUBLICATIONS

International Search Report from PCT International Application No. PCT/CN2013/077162, mailed Sep. 19, 2013, 5 pages.

Chinese Office Action and Search Report for Chinese Patent Application No. 201210194013.8, mailed Jun. 24, 2014.

International Preliminary Report on Patentability for International Application No. PCT/CN2013/077162, mailed Dec. 24, 2014.

* cited by examiner

METHOD AND APPARATUS FOR DETERMINING SECURITY INFORMATION OF AN UNKNOWN FILE IN A CLOUD SECURITY SYSTEM

CROSS-REFERENCE TO RELATED APPLICATION

This application is the U.S. National Phase application of International Application No. PCT/CN2013/077162, filed Jun. 13, 2013, entitled "METHOD AND DEVICE FOR DETERMINING SECURITY INFORMATION OF UNKNOWN FILE IN CLOUD SECURITY SYSTEM," and claims priority of Chinese Patent Application No. 201210194013.8, filed Jun. 13, 2012, the entire disclosures of both of which are incorporated herein by reference.

FIELD OF THE DISCLOSURE

The present disclosure relates to network security technical field, and more particularly, to a method and an apparatus for determining security information of an unknown file in a cloud security system.

BACKGROUND OF THE DISCLOSURE

Cloud security system refers to a system which stores file security information at a cloud security serving end. Cloud client end obtains prompt information indicating whether a file is safe by inquiring file security information stored in the cloud security serving end.

The cloud security system plays an important role in current network security field. Based on the cloud security system, the cloud client end may obtain the prompt information indicating whether the file is safe through querying the file security information in the cloud security serving end, without performing a security scan to the cloud client end.

SUMMARY OF THE DISCLOSURE

Examples of the present disclosure provide a method and an apparatus for determining security information of unknown file in a cloud security system, so as to determine the security information of the unknown file in the cloud security system.

The technical solution of the present disclosure is as follows.

A method for determining security information of an unknown file in the cloud security system includes:
  receiving, by a cloud security serving end, file security querying information reported by a cloud client end when a preconfigured monitoring point is triggered, wherein the file security querying information comprises identifier information and behavior information of a file; and
  creating, by the cloud security serving end, a behavior sequence of the file within a lifecycle according to the file security querying information of the file, analyzing the behavior sequence of the file within the lifecycle, and determining file security information of the file according to an analyzed result.

An apparatus for determining security information of an unknown file in the cloud security system includes: a receiving module, a creating module, an analyzing module and a determining module;
  the receiving module is to receive file security querying information reported by a cloud client end when a preconfigured monitoring point is triggered, wherein the file security querying information comprises identifier information and behavior information of a file;
  the creating module is to create a behavior sequence of the file within a lifecycle according to file security querying information of the file;
  the analyzing module is to analyze the behavior sequence of the file within the lifecycle; and
  the determining module is to determine file security information of the file according to an analyzed result of the analyzing module.

A non-transitory computer-readable storage medium, comprising a set of instructions for processing information is provided, the set of instructions to direct at least one processor to perform acts of:
  receiving, by a cloud security serving end, file security querying information reported by a cloud client end when a preconfigured monitoring point is triggered, wherein the file security querying information comprises identifier information and behavior information of a file; and
  creating, by the cloud security serving end, a behavior sequence of the file within a lifecycle according to the file security querying information of the file, analyzing the behavior sequence of the file within the lifecycle, and determining file security information of the file according to an analyzed result.

It can be seen from the above that, in the present disclosure, after receiving the file security querying information from the cloud client end, the cloud serving end associates the behavior information carried in the file security querying information reported by the cloud client end, creates a behavior sequence of the file within a lifecycle, analyzes the behavior sequence of the file within the lifecycle and determine file security information of the file according to an analyzed result. Thus, in the present disclosure, the cloud security serving end associates multiple behaviors of an unknown file within the lifecycle through associating the behavior sequence of the unknown file. The associated multiple behaviors, i.e., the behavior sequence provides an effective basis for determining the file security information of the unknown file. Thus, the file security information of the unknown file can be determined. In addition, the present disclosure does not require sample collection operations. Instead, the file security querying information reported by the cloud client end is utilized to generate the behavior sequence of the unknown file within the lifecycle. Thus, efficiency for determining the file security information of the unknown file is increased.

DETAILED DESCRIPTION OF THE DISCLOSURE

The present disclosure will be described in further detail hereinafter with reference to accompanying drawings and examples to make the technical solution and merits therein clearer.

Figure 1:
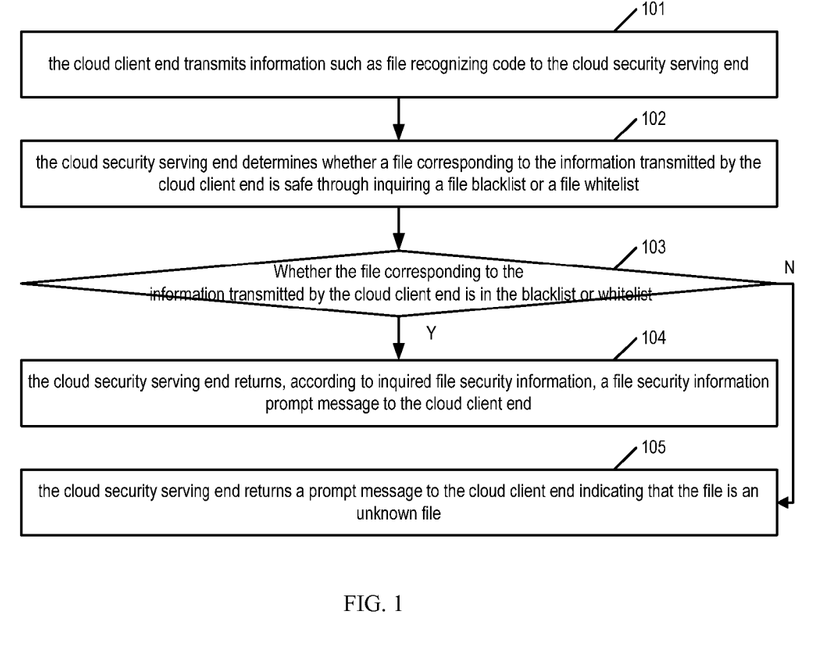
FIG. 1 shows a flowchart of a cloud client end obtaining security information from the cloud security serving end.

FIG. 1 shows a flowchart of a cloud client end obtaining security information from a cloud security serving end.

As shown in FIG. 1, the process includes the following.

At block 101, the cloud client end transmits information such as file recognizing code to the cloud security serving end.

At block 102, the cloud security serving end determines whether a file corresponding to the information transmitted by the cloud client end is safe through inquiring a file blacklist or a file whitelist.

At block 103, the cloud security serving end determines whether the file corresponding to the information transmitted by the cloud client end is in the blacklist or whitelist; if yes, the method proceeds to block 104; otherwise, the method proceeds to block 105.

At block 104, the cloud security serving end returns, according to inquired file security information, a file security information prompt message to the cloud client end.

At block 105, the cloud security serving end returns a prompt message to the cloud client end indicating that the file is an unknown file. If a file is not found in the whitelist or the blacklist, this file is an unknown file.

In view of the above, if the file security information of a particular file can be found in the blacklist or whitelist at the cloud security serving end, this file is a known file. With respect to unknown files, current cloud security system cannot determine their security information.

In examples of the present disclosure, after receiving file security querying information from the cloud client end, if the cloud security serving end does not find security information of the file, it obtains behavior information of the file within a lifecycle and creates a behavior sequence of the file within the lifecycle, analyzes the behavior sequence of the file within the lifecycle, and determines the security information of the file according to an analyzed result.

The cloud security serving end may obtain the behavior information of the file within the lifecycle via various methods. For example, after receiving the file security querying information from the cloud client end, the cloud security serving end, if not find the security information of the file, informs the cloud client end to report the behavior information of the file at predetermined time or when a predetermined trigger condition is met, e.g., when the file triggers a preconfigured monitoring point.

In one example of the present disclosure, the cloud security serving end may create, after receiving the file security querying information reported by the cloud client end when the preconfigured monitoring point is triggered, the behavior sequence of the file within the lifecycle according to the file security querying information reported by the cloud client end, analyze the behavior sequence of the file within the lifecycle and determine the file security information of the file according to the analyzed result. Based on the file security querying information, the cloud security serving end creates the behavior sequence of the file within the lifecycle. Thus, multiple behaviors of the file within the lifecycle are associated. The associated multiple behaviors, i.e., the behavior sequence provides an effective determination basis for determining the file security information. Thus, the file security information can be determined effectively. Since there are innumerable malicious files in current networks, file security database may be not updated timely. The present disclosure may solve the problem of determining the file security information of mass unknown files. In addition, the present disclosure combines the reporting of the file behavior information of the file with the file security querying information, i.e., report the file security querying information when the preconfigured monitoring point is triggered, and carry the file behavior information in the file security querying information. Thus, the querying procedure and determining procedure of the file security information may be combined into one procedure. One message, i.e., the file security querying information, may be utilized to realize the querying of the file security information and the reporting of the file behavior information. The procedure of querying the file security information and determining the file security information of the unknown file and message interactions are simplified.

Figure 2:
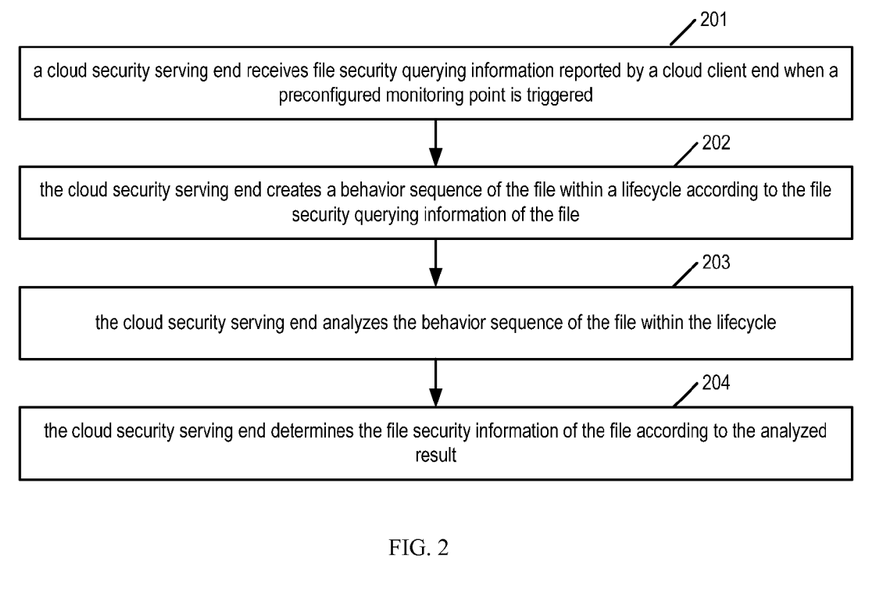
FIG. 2 shows an example of a method for determining file security information in the cloud security system according to the present disclosure.

FIG. 2 shows an example of a method for determining file security information in a cloud security system according to the present disclosure.

As shown in FIG. 2, the method includes the following.

At block 201, a cloud security serving end receives file security querying information reported by a cloud client end when a preconfigured monitoring point is triggered, wherein the file security querying information includes identifier information and behavior information of a file.

At block 202, the cloud security serving end creates a behavior sequence of the file within a lifecycle according to the file security querying information of the file.

Since the file security querying information includes the file identifier information and the file behavior information, it is possible to create the behavior sequence of the file within the lifecycle according to multiple pieces of file security querying information reported by the cloud client end with respect to the file.

At block 203, the cloud security serving end analyzes the behavior sequence of the file within the lifecycle.

Although it is impossible to determine the file security information of an unknown file according to a single behavior of the unknown file, multiple behaviors of the unknown file within the lifecycle form the behavior sequence, i.e., the multiple behaviors of the file within the lifecycle are associated, may act as a basis for determining the file security information. For example, after started, an unsigned program releases and loads an unknown driver, adds itself as a starting item, visits a malicious URL and copies itself to all disks. Such a behavior sequence is a high risk behavior sequence and the unknown file may be determined as an unsafe file.

At block 204, the cloud security serving end determines the file security information of the file according to the analyzed result.

In the method as shown in FIG. 2, after determining the file security information of the file, the cloud security serving end may also perform a series of operations according to the file security information of the file. For example, if it is determined that the file is a safe file, a prompt message indicating that the file is safe may be returned to the cloud client end. If it is determined that the file is an unsafe file, a prompt message indicating that the file is unsafe may be returned to the cloud client end. It is also possible to prompt the cloud client end to perform an antivirus operation.

In the above method, the monitoring point may be configured in an operating system of the cloud client end, used for monitoring positions that tend to be modified by malicious files, e.g., monitor processes, files, a register table and/or network behaviors of the cloud client end. Different risky levels may be assigned to different monitoring points according to dangerous degrees to the cloud client end.

When the monitoring point of the cloud client end is triggered, the cloud client end reports the file security querying information with respect to the file triggering the monitoring point. The file behavior information included in the file security querying information includes but is not limited to: information of a process triggering the monitoring point, object information operated by the process, and/or detailed action information of the process.

When analysis is performed to the behavior sequence of the file within the lifecycle, the cloud security serving end may analyze the behavior sequence of the file within the lifecycle according to the file behavior sequence model created according to file behavior sequences of safe files and/or file behavior sequences of unsafe files, so as to obtain the security level of the file.

The file behavior sequence model may be realized by an artificial intelligence (AI) method. For example, the file behavior sequence model includes but is not limited to: an expert system insensitive to outside changes; Bayesian decision system, genetic algorithm system, neural network system which have self-study capability; and effective context-related classification Markov chain system used for abnormal detection, etc.

After the security level of the file is obtained through analyzing the behavior sequence of the file within the lifecycle, the cloud security serving end may determine the file security information of the file according to the security level.

For example, if the security level of the file is higher than a first predefined threshold, the file is determined as a safe file, i.e., the file security information labels the file as a safe file. If the security level of the file is lower than a second predefined threshold, the file is determined as an unsafe file, i.e., the file security information labels the file as an unsafe file.

If the security level determined according to the behavior sequence of the file is not enough to determine whether the file is safe or not, e.g., when the security level is between the first threshold and the second threshold, the cloud security serving end may inquire a statistic information database for a statistical result of feedback information with respect to the file. The security level of the file and the statistical result of the feedback information with respect to the file are weighted. The file security information of the file is determined according to a weighted result.

The statistic information database is used for storing the feedback information of the unknown file. The feedback information may include but is not limited to: running times of the unknown file and selection distribution information of an operation type of the unknown file, etc. For example, a particular unknown file is downloaded for 1000 times by users, 239 users select to allow the running of the file, whereas other users select to forbid the running of the file. After receiving the security prompt information returned by the cloud client end with respect to the unknown file, the cloud security serving end operates according to the security prompt information (e.g., allow the file to run, or forbid the file to run, etc.) and returns operation information of the file to the cloud client end. The cloud security serving end updates the statistic information database according to the operation information returned by the cloud client end.

Besides used for determining the file security information through being weighted together with the security level generated by the behavior sequence of the file within the lifecycle, the information in the statistic information database may be further used for assisting the client end to select an operation to the unknown file.

In particular, if the cloud security serving end does not find the file security information of a particular file in the file security database, it is determined that the file is an unknown file. With respect to this file, the cloud security serving end may inquire the statistic information database for the statistical result of feedback information with respect to this file and return security prompt information to the cloud client end according to the statistical result of the feedback information. For example, the security prompt information may include but is not limited to: running times of the unknown file, distribution information of selections of operation types of the unknown file.

In view of the above, through a bi-directional feedback method, i.e., the cloud client end feeds back operation information of the unknown file, and the cloud security serving end returns statistical result of the feedback information with respect to the unknown file after receiving the file security querying information of the unknown file, effective information about the unknown file is provided, including but is not limited to running times of the unknown file and selection distribution information of operation types of the unknown file, so as to assist the client end to select a proper operation type to the unknown file. For example, the cloud security serving end returns information to the client end indicating that majority of other users select to forbid a program, which indicates that most users do not trust this program. Unless knowing the purpose of the program, the user may select to forbid the running of the program, so as to avoid running of the malicious program. On the other hand, the statistical information of selections of the users may be updated continuously by the cloud security serving end.

The bi-directional feedback method is especially effective during initial active period of the unknown file. For example, when the user downloads a program and the program is to be loaded and running, the client end monitors this action and performs a cloud inquiry. At this time, the cloud security serving end does not have the file security information of this file at the moment. Thus, the cloud security serving end searches the statistical information database and returns statistical information of usage and selection situations of other users to the client end. The client end may use the statistical information to determine whether to run the program. Then the cloud client end feeds back the selection information of the user to the cloud security serving end.

In view of the above, the present disclosure associates a plurality of behaviors of the file within the lifecycle according to the file security querying information of the file, generates a behavior sequence to provide a basis for determining the file security information of the file, so as to determine the file security information of the unknown file. Specifically, when being combined with the feedback information, security information may be created better for the unknown file, which solves the problem of determining the security information of mass unknown files.

Figure 3:
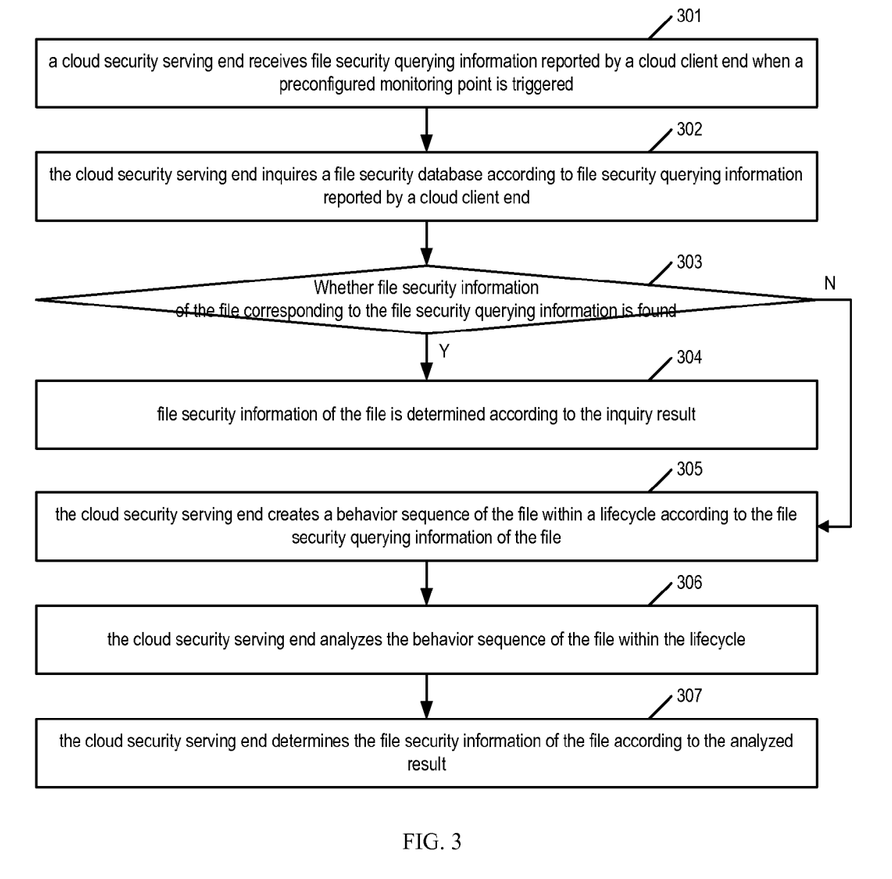
FIG. 3 shows another example of a method for determining the file security information in the cloud security system according to the present disclosure.

FIG. 3 shows an example of a method for determining file security information in a cloud security system according to the present disclosure.

As shown in FIG. 3, the method includes the following.

Block 301 is similar to block 201.

At block 302, the cloud security serving end inquires a file security database according to file security querying information reported by a cloud client end.

At block 303, the cloud security serving end determines whether file security information of the file corresponding to the file security querying information is found, if yes, block 304 is performed; otherwise, block 305 is performed.

At block 304, file security information of the file is determined according to the inquiry result and then the method ends.

In this block, the file security information searched out may be determined as the file security information of the file and is returned to the cloud client end.

Blocks 305~307 are similar to blocks 202~204 and are not repeated herein.

Figure 4:
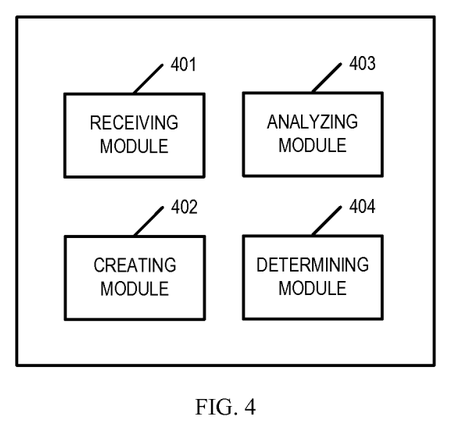
FIG. 4 shows an example of an apparatus for determining file security information in the cloud security system according to the present disclosure.

In accordance with the above method examples an example of the present disclosure provides an apparatus, as shown in FIG. 4.

FIG. 4 shows an example of an apparatus for determining file security information in a cloud security system according to the present disclosure.

As shown in FIG. 4, the apparatus includes a receiving module 401, a creating module 402, an analyzing module 403 and a determining module 404.

The receiving module is to receive file security querying information reported by a cloud client end when a preconfigured monitoring point is triggered, wherein the file security querying information includes identifier information of a file and behavior information of the file.

The creating module 402 is to create a behavior sequence of the file within a lifecycle according to the file security querying information of the file.

The analyzing module 403 is to analyze the behavior sequence of the file within the lifecycle.

The determining module 404 is to determine file security information of the file according to an analyzed result of the analyzing module 403.

The analyzing module 43 may analyze the behavior sequence of the file within the lifecycle based on a file behavior sequence model to obtain a security level of the file, wherein the file behavior sequence model is created according to file behavior sequences of safe files and/or file behavior sequences of unsafe files.

The determining module 404 may determine the file security information of the file according to the security level determined by the analyzing module 304. If the security level is higher than a first threshold, the file security information labels the file as a safe file. If the security level is lower than a second threshold, the file security information labels the file as an unsafe file.

Figure 5:
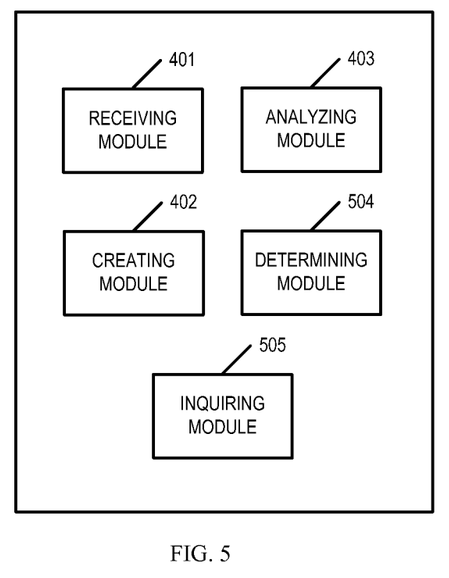
FIG. 5 shows another example of an apparatus for determining file security information in the cloud security system according to the present disclosure.

FIG. 5 shows another example of an apparatus for determining file security information according to the present disclosure. As shown in FIG. 5, the apparatus includes: a receiving module 401, a creating module 402, an analyzing module 403, a determining module 504 and an inquiring module 505.

Functions and operations of the receiving module 401, creating module 402 and analyzing module 403 in FIG. 5 are similar to those corresponding modules in FIG. 4 and are not repeated herein.

The inquiring module 505 is to inquire a file security database according to the file security information reported by the cloud client end before the creating module 402 creates the behavior sequence of the file within the lifecycle according to the file security querying information of the file.

The determining module 504 is to determine the file security information of the file according to an inquiry result of the inquiring module 505 if the inquiring module 505 finds the file security information of the file, and determine the file security information of the file according to the analyzed result of the analyzing module 403 if otherwise.

Figure 6:
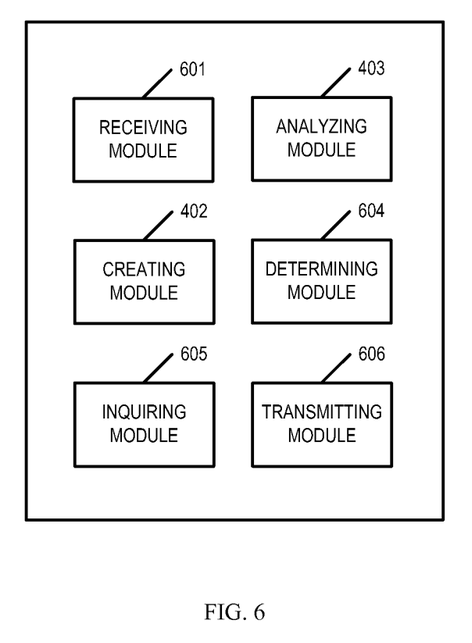
FIG. 6 shows still another example of an apparatus for determining file security information according to the present disclosure.

FIG. 6 shows still another example of an apparatus for determining file security information according to the present disclosure. As shown in FIG. 6, the apparatus includes a receiving module 601, a creating module 402, an analyzing module 403, a determining module 604, an inquiring module 605 and a transmitting module 606.

Functions and operations of the creating module 402 and analyzing module 403 are similar to those of corresponding modules in FIG. 4 and are not repeated herein.

The inquiring module 605 is to inquire a statistic information database according to the file security querying information reported by the cloud client end if the security level determined by the determining module 604 is lower than a first threshold and is higher than a second threshold, to obtain a statistical result of feedback information with respect to the file from the statistic information database.

Besides the functions similar to the determining module 404 in FIG. 4 and determining module 504 in FIG. 5, the determining module 604 is further to determine the file security information of the file according to the statistical result of the feedback information obtained by the inquiring module 605 and the security level of the file, e.g., assign weights to the statistical result of the feedback information and the security level and determine the file security information according to a weighted result.

The transmitting module 606 is to return security prompt information to the cloud client end according to the statistical result of the feedback information obtained by the inquiring module 605, such that the cloud client end operates the file according to the file security prompt information.

Besides the functions similar to the receiving module 401 in FIG. 4, the receiving module 601 is further to receive operation information of the cloud client end to the file, and update the statistic information database according to the operation information.

An example of the present disclosure further provides a non-transitory machine readable storage medium, including a set of instructions executable by one or more processors to perform the method for determining security information of an unknown file. In particular, a system or an apparatus equipped with storage medium may be provided. The storage medium comprises a set of program codes executable by a processor (e.g., CPU or MCU) of the system or apparatus to perform actions of any example described above.

The program codes stored on the storage medium may realize the functions of any example described above. Therefore, the program codes and the storage medium storing the program codes form part of the present disclosure.

The storage medium storing the program codes may include floppy disk, hard disk, magnetic disk, compact disk (e.g., CD-ROM, CD-R, CD-RW, DVD-ROM, DVD-RAM, DVD-RW, DVD+RW), magnetic tape, non-transitory storage card and ROM. In one example, the program codes may be downloaded from a server computer via a communication network.

It should be noted that, some or all operations may also be performed by an operating system of a computer based on the program codes to implement functions of the examples of the present disclosure.

In addition, the program codes may be read from the storage medium and written in a memory in an extended card inserted in the computer or written in a memory in an extended unit connected with the computer. Thereafter, the program codes are executed by a processor in the extended card or the extended unit to perform all or some operations, so as to implement functions of the examples described above.

What has been described and illustrated herein is a preferred example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

The invention claimed is:

1. A method for determining security information of an unknown file, comprising:
receiving, by a cloud security serving end, file security querying information reported by a cloud client end when a preconfigured monitoring point is triggered, wherein the file security querying information comprises identifier information and behavior information of a file; and
creating, by the cloud security serving end, a behavior sequence of the file within a lifecycle according to the file security querying information of the file, analyzing the behavior sequence of the file within the lifecycle, and determining file security information of the file according to an analyzed result;
wherein the analyzing the behavior sequence of the file within the lifecycle and determining file security information of the file according to the analyzed result comprises:
analyzing the behavior sequence of the file within the lifecycle according to a file behavior sequence model created based on at least one of file behavior sequences of safe files and file behavior sequences of unsafe files, to obtain a security level of the file; if the security level is higher than a first threshold, determining the file security information of the file to be a safe file; if the security level is lower than a second threshold, determining the file security information to be an unsafe file;
if the security level is lower than the first threshold and higher than the second threshold, the cloud security serving end inquiring a statistic information database to obtain a statistical result of feedback information of the file, and determining the file security information of the file according to the security level and the statistical result of the feedback information.

2. The method of claim 1, wherein the determining the file security information of the file according to the security level and the statistical result of the feedback information comprise:
weighting the statistical result of the feedback information and the security level, and determining the file security information according to a weighted result.

3. The method of claim 1, further comprising:
after the cloud security serving end determines the file security information of the file according to the security level of the file and the statistical result of the feedback information of the file, transmitting security prompt information to the cloud client end, such that the cloud client end operates the file according to the security prompt information after receiving the security prompt information transmitted by the cloud security serving end and returns operation information of the file to the cloud security serving end, updating, by the cloud security serving end, the statistic information database according to the operation information returned by the cloud client end.

4. The method of claim 1, further comprising:
before creating the behavior sequence of the file within the lifecycle according to the file security querying information of the file, inquiring, by the cloud security serving end, a file security database according to the file security querying information reported by the cloud client end, if the file security information of the file is found, determining the file security information of the file according to an inquiry result; otherwise, executing the process of creating the behavior sequence of the file within the lifecycle according to the file security querying information of the file.

5. The method of claim 1, wherein the preconfigured monitoring point is in an operating system of the cloud client end, used for monitoring at least one of a process, a file, a registry table and a network behavior of the cloud client end.

6. The method of claim 5, wherein the monitoring point has a risky level corresponding to a dangerous degree to the cloud client end.

7. The method of claim 1, wherein the behavior information of the file comprises at least one of: information of a process triggering the monitoring point, object information operated by the processed, and action information of the process.

8. An apparatus for determining security information of an unknown file in a cloud security system, comprising:
one or more processors;
memory; and
one or more program modules stored in the memory and to be executed by the one or more processors, the one or more program modules including:
a receiving module, a creating module, an analyzing module and a determining module;
the receiving module is to receive file security querying information reported by a cloud client end when a preconfigured monitoring point is triggered, wherein the file security querying information comprises identifier information and behavior information of a file;
the creating module is to create a behavior sequence of the file within a lifecycle according to file security querying information of the file;
the analyzing module is to analyze the behavior sequence of the file within the lifecycle; and
the determining module is to determine file security information of the file according to an analyzed result of the analyzing module;
wherein the analyzing module is to analyze the behavior sequence of the file within the lifecycle according to a file behavior sequence model created based on at least one of file behavior sequences of safe files and file behavior sequences of unsafe files, to obtain a security level of the file;
the determining module is to determine the file security information of the file to be a safe file if the security level is higher than a first threshold, and determine the file security information to be an unsafe file if the security level is lower than a second threshold;
the apparatus further comprising:
an inquiring module, to inquire a statistic information database to obtain a statistical result of feedback information of the file if the security level is lower than the first threshold and higher than the second threshold, and
the determining module is further to determine the file security information of the file according to the security level and the statistical result of the feedback information.

9. The apparatus of claim 8, wherein the determining module is further to weight the statistical result of the feedback information and the security level, and determine the file security information according to a weighted result.

10. The apparatus of claim 8, further comprising: a transmitting module;

the transmitting module is to transmit, after the determining module determines the file security information of the file according to the security level of the file and the statistical result of the feedback information of the file, security prompt information to the cloud client end, such that the cloud client end operates the file according to the security prompt information after receiving the security prompt information;

the receiving module is further to receive operation information of the file returned by the cloud client end, and update the statistic information database according to the operation information returned by the cloud client end.

11. The apparatus of claim 8, wherein the preconfigured monitoring point is in an operating system of the cloud client end, used for monitoring at least one of a process, a file, a registry table and a network behavior of the cloud client end.

12. The apparatus of claim 11, wherein the monitoring point has a risky level corresponding to a dangerous degree to the cloud client end.

13. The apparatus of claim 8, wherein the behavior information of the file comprises at least one of: information of a process triggering the monitoring point, object information operated by the processed, and action information of the process.

14. A non-transitory machine-readable storage medium, comprising a set of instructions executable by one or more processors to perform actions of:

receiving, by a cloud security serving end, file security querying information reported by a cloud client end when a preconfigured monitoring point is triggered, wherein the file security querying information comprises identifier information and behavior information of a file; and creating, by the cloud security serving end, a behavior sequence of the file within a lifecycle according to the file security querying information of the file, analyzing the behavior sequence of the file within the lifecycle, and determining file security information of the file according to an analyzed result;

wherein the analyzing the behavior sequence of the file within the lifecycle and determining file security information of the file according to the analyzed result comprises:

analyzing the behavior sequence of the file within the lifecycle according to a file behavior sequence model created based on at least one of file behavior sequences of safe files and file behavior sequences of unsafe files, to obtain a security level of the file; if the security level is higher than a first threshold, determining the file security information of the file to be a safe file; if the security level is lower than a second threshold, determining the file security information to be an unsafe file;

if the security level is lower than the first threshold and higher than the second threshold, the cloud security serving end inquiring a statistic information database to obtain a statistical result of feedback information of the file, and determining the file security information of the file according to the security level and the statistical result of the feedback information.

* * * * *